Patented Sept. 2, 1952

2,609,352

UNITED STATES PATENT OFFICE 2,609,352

PROCESS FOR PREPARING MONOMERIC STABLE METHYLOLPHENOL COMPOSITIONS

Hamline M. Kvalnes, Wilmington, Del., assignor to E. I. du Pont de Nemours and Company, Wilmington, Del., a corporation of Delaware No Drawing. Application May 22, 1951, Serial No. 227,761

15 Claims. (Cl. 260—45.1)

This invention relates to certain novel and useful monomeric polymethylolphenol compositions, and to processes for preparing the same. It also relates to the preparation of novel viscous liquids from the said polymethylolphenols, which liquids have useful properties in the manufacture of phenol-formaldehyde resins.

It was known heretofore that phenol reacts relatively slowly with formaldehyde; i. e., that higher temperatures and catalyst concentrations have been required to obtain the same rate of reaction of formaldehyde with phenol as with other well-known resin intermediates such as urea, melamine or resorcinol. According to the previously known commercial practice, from 1 to 3 mols of formalin were mixed with one mol of phenol, to produce a clear liquid containing the unreacted ingredients in aqueous solution. Under moderately strongly alkaline conditions, or very strongly acid conditions, methylolphenols were formed in such solutions, and these were convertible, by the action of heat, to polymeric products. However, the methylolphenol solutions had very poor storage properties, and after a few months at room temperature such solutions were no longer homogeneous, but contained two layers, viz.: (1) a lower resinous layer and (2) an upper aqueous layer. When the initial formaldehyde: phenol mol ratio (F/P) was greater than 1 the lower layer eventually set to a gel. To avoid this separation of phases and formation of gel it has been found possible heretofore to employ compositions in which the pH was carefully controlled; mildly acidic conditions had a very highly beneficial effect on the storage properties of these methylolphenol solutions. However, when attempts were made to produce the same stabilizing effect on highly concentrated methylolphenols, prepared for example from 60% formaldehyde (+40% water), and phenol, products which became solid or opaque in from 1 to 24 hours were obtained. This disadvantage placed a limitation on the use of highly concentrated formaldehyde in the manufacture of phenolic resins. From an economic standpoint, it was desirable to employ 60% formaldehyde for numerous applications in making phenolic resins, provided the technical difficulties just described could be overcome. Furthermore, it was also desirable, from an economic standpoint, for certain other applications, to employ 37% formaldehyde.

Very recently an important advance has been made in the commercial method for preparing resins other than phenolic resins, particularly urea resins, using very concentrated formaldehyde, e. g. 60%; it has been discovered that, in the manufacture of higher methylolureas, if one keeps monomeric formaldehyde at a high enough temperature to prevent polymerization of the formaldehyde prior to admixture with urea under methylolurea-forming condition, stable liquid polymethylolureas can be obtained, which liquids remain clear for very extended periods of time (Kvalnes, Reissue Patent 23,174). It was not known, however, that any corresponding effect could also be achieved in the manufacture of highly concentrated polymethylol-phenol liquid compositions.

Moreover, in attempting to apply the process of the Kvalnes reissue patent to phenol, it was at first found that the formation of methylol groups upon reaction of phenol with 60% formaldehyde takes place too slowly to permit preventing the formation of precipitates by using polymer-free formaldehyde initially, as could be done in the urea-formaldehyde art. Probably this was because the precipitates which formed were the result of excessive formaldehyde polymerization, which takes place preferentially in the phenol system, but not preferentially in the urea system.

An object of the present invention is to provide polymethylol phenol compositions which remain clear, at high concentrations, for relatively long periods of time. A further object is to provide a process for preparing methylolphenols from relatively concentrated aqueous formaldehyde, having a formaldehyde content in excess of 58% by weight. Another object is to provide novel improvements in the art of condensing phenol with formaldehyde. Other objects will appear hereinafter.

It has been discovered, in accordance with this invention, that stable, clear, precipitate-free liquids can be obtained by mixing from 4.0 to 10.0 mols of monomeric formaldehyde with 1.0 mol of phenol, and heating the resulting mixture at a temperature within the range of 60° to 100° C. (preferably 80° to 90° C.) at a pH of 7.0 to 9.5 for a reaction time so controlled that the free formaldehyde content decreases to less than 35% of the total weight of the mixture, thereupon chilling the mixture to form a clear liquid composition having a temperature not exceeding 30° C., the quantity of formaldehyde being initially from 58% to 65% of the quantity of formaldehyde plus water. The formaldehyde which is employed in practicing the invention is kept substantially free of polymeric formaldehyde by maintaining it at a temperature of 60° to 90° C. continuously until the said formaldehyde is brought into contact with the said phenol. For prolonged storage at room temperature the final pH is preferably adjusted to 4.5–6.8, the optimum final pH being 5.5–6.5. Such products remain clear for prolonged periods of time. The products obtained as above described can be bodied by heating at 70° to 100° C. at a pH of 7.0 to 9.5, and the bodied products can be admixed with a formaldehyde-reactive resin ingredient, e. g. urea (which may be added alternatively prior to bodying) and the resulting mixture can be thermoset by heating at 120° to 175° C. If the added ingredient is phenol the thermosetting reaction takes place under strongly acidic or alkaline conditions, while if the added ingredient is urea, acidic thermosetting conditions must be employed.

The amount of methylolation can be measured conveniently by analysis for free formaldehyde and determining the number of methylol groups by difference; of course, once this has been done it is also possible to predetermine the degree of methylolation by controlling the reaction time, with reference to the previously obtained data, such as that contained in the present specification.

To illustrate the effect of free formaldehyde content on the stability of the polymethylol phenol compositions, a series of experiments was made in which the mixtures of phenol and aqueous formaldehyde were heated together (pH=8, Temp.=80° to 85° C.), using various F/P ratios (i. e. mol ratios of total formaldehyde:total phenol). The results are set forth in the following table. The 60% formaldehyde employed in these experiments was a clear monomeric aqueous liquid which was maintained at approximately 80° C. from the time when it was produced until it was used.

TABLE I.—*Effect of free HCHO on stability of polymethylolphenols*

| F/P | Free HCHO | Methylol groups per phenol | Stability test (Formation of precipitate on storage—failure) |
|---|---|---|---|
|  | Percent |  |  |
| 6.0 | 43.3 | 0.19 | Failed. |
| 7.0 | 40.3 | 0.96 | Do. |
| 7.0 | 38.6 | 1.19 | Do. |
| 6.5 | 37.6 | 1.16 | Do. |
| 6.0 | 34.9 | 1.34 | o. k. |
| 6.0 | 32.6 | 1.50 | o. k. |
| 5.5 | 31.6 | 1.55 | o. k. |
| 6.0 | 31.0 | 1.73 | o. k. |
| 5.0 | 30.5 | 1.42 | o. k. |
| 4.5 | 30.0 | 1.20 | o. k. |
| 6.0 | 29.1 | 2.13 | o. k. |
| 6.0 | 28.3 | 2.25 | o. k. |
| 6.0 | 28.3 | 2.25 | o. k. |
| 6.0 | 26.3 | 2.54 | o. k. |
| 4.0 | 22.5 | 1.65 | o. k. |

When the F/P ratio is 10, a trimethylol phenol containing about 35% free formaldehyde, prepared as above described, is stable.

Data recorded in Table II show that it is necessary to employ a F/P ratio below 1 to obtain a stable liquid if the reaction mixture, made from 60% HCHO, is cooled quickly from 80° C. to room temperature, without allowing time for methylolation to take place. As disclosed in the Kvalnes reissue patent, parallel experiments with urea instead of phenol do not produce an analogous result, for in the case of urea it is necessary to heat the methylolation mixture only momentarily, there being no difficulty due to polymerization of formaldehyde during the cooling of the methylolation mixture. Table II thus shows that the phenol methylolation mixture does not behave in a manner analogous to the behavior of the urea methylolation mixture of the Kvalnes reissue patent.

TABLE II.—*Need for low F/P ratios in making clear solutions from 60% formaldehyde prior to methylolation*

[Mixtures of 88% phenol (aqueous), adjusted to pH 8 with 20% sodium hydroxide, and 60% formaldehyde (aqueous) were prepared by adding formaldehyde at 80° C. to phenol at room temperature. The formaldehyde was a clear liquid which had been maintained at approximately 80° C. from the time of its preparation until the time of its use. The clear solutions were cooled rapidly to room temperature and adjusted to pH 6.5 with 10% hydrochloric acid as shown in the table below; only the sample at an F/P ration of less than 1.0 was stable on storage.]

| Test No. | 1 | 2 | 3 | 4 |
|---|---|---|---|---|
| F/P mol ratio | 4.1 | 3.1 | 2.1 | 0.8 |
| Total formaldehyde, percent | 40.00 | 35.87 | 29.66 | 16.70 |
| Total phenol, percent | 30.33 | 36.20 | 45.00 | 68.40 |
| Active resin solids, percent | 70.38 | 72.07 | 74.66 | 85.10 |
| Appearance of product after storage at room temperature: |  |  |  |  |
| (1) 1 hour | opaque | opal. | clear | clear. |
| (2) 1 day |  | opaque | do. | Do. |
| (3) 1 month |  |  | opaque | Do. |

The following examples further illustrate the conditions required for the production of clear polymethylol phenol compositions. The first example illustrates the difficulty of effecting stabilization of a polymethylolphenol solution containing polymeric formaldehyde. In that example, the methylolphenol was prepared from monomeric formaldehyde under the conditions specified, and after 20 minutes' heating the unreacted formaldehyde which remained in the mixture polymerized on storage. To effect methylolation from this polymeric formaldehyde it was necessary to heat the mixture for the prohibitively long time of 15 hours. Example 1 should be compared with Example 2, because in Example 2 it is shown that when the methylolation is continued until the free formaldehyde falls below 35%, this difficulty is not encountered.

*Example 1.*—Samples of F/P 4.8 and F/P 6.0 were prepared as follows: 85.5% synthetic phenol (remainder=H₂O) was adjusted to pH 8 with 20% sodium hydroxide and heated to 40° C. Then 60.5% formaldehyde (remainder=H₂O), which had never been permitted to cool below 80° C., was added and the pH was again adjusted to 8. The charge was then heated at 80 to 85° C. for 20 minutes while maintaining the pH at 7 to 8. The resulting clear liquids were cooled rapidly to room temperature. After one day at room temperature the products were opaque. Additional heating was required to obtain liquids which remained clear on storage at room temperature. This is shown in the following table.

TABLE III.—*Effect of methylol and free formaldehyde content on clarity of methylolphenol liquids*

| Test No. | 5 | 6 |
|---|---|---|
| F/P mol ratio | 4.8 | 6.0 |
| 20 minutes/85° C./pH 7 to 8: (1) Stored 1 day at room temp. | opaque | opaque |
| Time required to dissolve paraformaldehyde thus produced | 15 hours/60°C./ pH 7 to 8 | 15 hours/60°C./ pH 7 to 8 |
| (1) Stored 5 months at room temp. | clear | clear |

*Example 2.*—737 grams of 60.9% clear, liquid, aqueous formaldehyde (which had not been permitted to cool below 80° C.) was added to 263 grams of 88% USP phenol which had been adjusted to pH 8 with 20% sodium hydroxide. The mixture (F/P=6:1) was reacted as shown in the following table.

TABLE IV.—*Effect of reaction time on degree of methylolation*

| Temp. (°C.) | Time (min.) | pH [1] | Free HCHO | Methylol Groups/Phenol | Sample at Room Temp. |
|---|---|---|---|---|---|
| 52 | 0 | 7.7 | | | |
| 70 | 12 | 8.3 | | | Solid in 5 minutes. |
| 90 | 30 | 8.1 | | | Opalescent in 10 minutes. |
| 90 | 60 | 8.0 | 34.9 | 1.33 | Precipitate in 1 month. |
| 89 | 75 | 7.8 | 31.0 | 1.87 | Clear after 3 months. |

[1] 6 ml. of 20% sodium hydroxide added during the run.

*Example 3.*—Mixtures of 88% USP phenol and 60% formaldehyde (which had not been permitted to cool below 80° C.) of various F/P mol ratios were reacted at approximately 85° C. and pH 8 to 9 for 15 minutes. The properties of the products are given in the following table. This series of experiments again shows that at free formaldehyde contents below 35% precipitates do not form. It also shows that for F/P ratios of 6.2 and below, under the conditions of the example, the free formaldehyde content is reduced to the level required for avoiding formaldehyde polymerization, in a reaction time of 9 to 15 minutes.

to polymerization of either formaldehyde, the methylolphenols, or both. Once a sufficient amount of methylolation is effected, a balance, or equilibrium, appears to prevail, whereby in some manner not necessarily understood polymerization of the remaining free formaldehyde no longer takes place, or at least does not produce a solid phase. This is especially noticeable if the pH of the final product is adjusted to about 5.0 to 6.0 prior to storage.

The methylolation step should preferably not be carried out at a pH higher than 9.5, because higher alkalinities result in destruction of formaldehyde. There is a range of pH on the acid side within which methylolation can be effected without rapid polymerization, namely at about pH 4. Nevertheless, the present invention is not directed to the use of an acidic mixture in the methylolation step. The alkaline methylolation step is preferred over an acidic methylolation step, because on the acid side, at the pH which is TABLE V.—*Effect of F/P mol ratio on stability of methylolphenols*

| Test No. | 7 | 8 | 9 | 10 | 11 | 12 |
|---|---|---|---|---|---|---|
| 1. F/P mol ratio | 6.8 | 6.2 | 5.2 | 4.7 | 4.1 | 3.1 |
| 2. Total formaldehyde, percent | 45.36 | 44.40 | 42.01 | 40.38 | 38.04 | 34.00 |
| 3. Total phenol, percent | 21.09 | 22.34 | 25.39 | 27.17 | 29.42 | 34.93 |
| 4. Active resin solids, percent | 66.45 | 66.74 | 67.40 | 67.55 | 67.46 | 68.93 |
| Product: | | | | | | |
| 5. Free formaldehyde, percent | 35.6 | 33.5 | 31.0 | 30.6 | 22.0 | 18.0 |
| 6. Methylol groups/phenol | 1.5 | 1.4 | 1.4 | 1.5 | 1.7 | 2.4 |
| 7. Viscosity, cp., 25° C | 15 | 15 | 15 | 15 | 25 | 25 |
| 8. Freezing point, °C | | −27.5 | −25 | | | |
| 9. Specific gravity, 60° F./60° F | 1.19 | 1.19 | 1.19 | 1.19 | 1.19 | 1.18 |
| 10. R. I., 25° C | 1.454 | 1.456 | 1.467 | 1.462 | 1.477 | 1.483 |
| 11. Water miscibility | zero | complete | complete | complete | complete | complete |
| 12. Appearance (2 months at room temp.) | opaque | clear | clear | clear | clear | clear |

The examples given above serve to illustrate the invention, and, of course, numerous embodiments other than those illustrated are possible, without departing from the inventive principle herein disclosed. In the foregoing examples, if one employs concentrated formaldehyde (e. g. 60%) which is not protected against polymerization prior to use, the products invariably are not clear. An important aspect of the invention is therefore the discovery of the conditions required for effecting methlolation in preference not so low as to produce rapid polymerization, the rate of methylolation is too slow, as shown in the following test: A mixture of 88% USP phenol and monomeric 60% liquid formaldehyde (both aqueous) was heated at 85° C. and a pH of 4.0 for 15 minutes, giving a mixture having a free formaldehyde content of 43.3% which was very close to the free formaldehyde content of the initial reaction mixture (cf. test 8 of Table V, showing much more rapid methylolation at a pH of 8 to 9).

The unpolymerized methylolphenol compositions obtained by the method of this invention, hereinabove described, are referred to (for convenience) by the expression HMP's. The HMP's are useful in making resin intermediates and also in the manufacture of thermoset resins. The illustrations which follow show numerous useful properties of these resins and resin intermediates.

*Preparation of viscous products from HMP without adding other resin-forming ingredients*

A clear sample of higher methylolphenol containing five mols of formaldehyde per mol of phenol (F/P=5) was prepared by heating at 90° C. 86% synthetic phenol (14% H2O) and 60% monomeric formaldehyde (40% H2O) at a pH of 8 until the free formaldehyde was reduced to 19.4% (2.5 methylol groups per unit of phenol). The resulting mixture was heated at 95° C. and pH 7.3 to 7.6 for 90 minutes. The viscosity increased from 25 cp. to 245 cp. The viscous product thus obtained was clear and could be used in the manufacture of thermoset resins by the procedure hereinbelow described.

The preferred temperature for preparing viscous produces from HPM is about 70° to 100° C. (preferred pH, 7.0 to 9.5).

*Preparation of viscous products from HMP and urea*

A clear solution was prepared at room temperature by mixing 80 parts of higher methylolphenol solution (F/P=6, prepared by the method of Example 3) and 20 parts of urea. The resulting composition had a total formaldehyde content, free and combined, of 35% by weight. It also contained 18% by weight of combined phenol and 18% by weight of free urea. This solution was heated at 80° C. for 15 minutes at a pH of 7.2 to 7.8 at the end of which time the viscosity was 40 cp. and the free formaldehyde was 0. The pH was then adjusted to 5.0 to 6.0 with 2.5% hydrochloric acid and the resulting mixture was heated at 80° for 45 minutes after which the resulting clear product was cooled rapidly to room temperature. The clear liquid thus obtained had a viscosity of 165 cp. at 25° C.

The preferred temperature for preparing viscous products from HMP and urea is 70° to 100° C. (preferred pH=7.0 to 9.5) until % HCHO=0.

*Preparation of viscous products from HMP and added phenol*

Methylolphenols are readily converted to polymers under alkaline conditions and a pH of 7.5 to 8.5 is preferred in preparing viscous compositions from mixtures of HMP and phenol. However, under acid conditions, even when the pH is as high as 4, the rate of polymer forming reaction is appreciable (as shown in Example 2).

A mixture consisting of 79 parts by weight of higher methyloyphenol solution (F/P=6.0, prepared by the method of Example 3) and 21 parts of 88% USP phenol was prepared at room temperature. This mixture contained 34.2% free and combined formaldehyde and 35.7% free and combined phenol. It was heated to 86° C. in 25 minutes, whereupon the free formaldehyde was 0. The heating was continued at 90° C. for an additional 30 minutes at which time the pH was 6.15 (initial pH=7.3) and the viscosity was 22 cp. (the initial viscosity=15 cp.). The pH was lowered to 4.0 with 5% hydrochloric acid and the charge was heated for an additional 45 minutes, the product was cooled rapidly and adjusted to pH 6.7 with 20% sodium hydroxide. The resulting material was a clear, brown-colored liquid with a viscosity of 35 cp. at 25° C.

The preferred temperature for preparing viscous products from HMP and added phenol is 70° to 100° C., and the preferred pH at the aforesaid temperature is 7.5 to 8.5. The heating should be continued until the free formaldehyde content is less than 5%.

*Preparation of a thermoset resin from HMP and urea*

A higher methylolphenol solution was prepared by adding 737 grams of 60.4% aqueous liquid formaldehyde (monomeric) at 61° C. to 263 grams of 87% USP phenol (pH=8.0). To the resulting mixture at a temperature of 47° C. was added 13 ml. of 20% sodium hydroxide aqueous solution and the resulting mixture was heated to 90° C. in 19 minutes. The temperature of the mixture was maintained at 85° to 90° C. for 15 minutes after which the mixture was cooled to room temperature. To the clear solution thus obtained, having a pH of 8.4 was added 16 ml. of 10% hydrochloric acid which lowered the pH to 6.5. The free formaldehyde content of the resulting mixture was 29.6; the viscosity was 22 cp.; the specific gravity (60° F./60° F.), 1.201; the refractive index, 1.460/25° C. This product was completely miscible with water and contained 43.3% free and combined formaldehyde and 22.2% combined phenol. An adhesive was prepared by adding to 100 grams of this mixture, 22 grams of urea, 20 grams of walnut shell flour, and 0.35 gram of ammonium chloride. Douglas fir plywood panels (1/8" x 12" x 12") were bonded with this adhesive at a pressure of 150 lbs./sq. in. and a temperature of 150° C. for 10 minutes. Specimens of the resulting plywood were tested in a shear machine, after having been kept at 93% relative humidity at 75° C. for 24 hours. Average wood failure was 33% and the average shear value was 230 lbs./sq. in. In this test the quantity of adhesive employed was 48 lbs./1000 sq. ft. of single glue line. In similar tests with commercial urea formaldehyde adhesives using 59 lbs./1000 sq. ft. instead of 48 lbs./1000 sq. ft. the average wood failure was 7% and the average shear value was 109 lbs./sq. in.

*Preparation of a thermoset resin from viscous HMP solution and urea*

An adhesive was prepared by mixing 100 grams of the viscous HMP-urea solution prepared from 80 grams HMP and 20 grams of urea by the method hereinabove described with 20 grams of walnut shell flour and 0.35 gram of ammonium chloride. Douglas fir plywood was prepared by the method described in the immediately preceding experiment using 60 lbs. of this adhesive per 1000 sq. ft. of single glue line. When exposed to 98% relative humidity at 75° C. for 24 hours and tested in the shear machine, the specimens showed 87% wood failure and had an average shear value of 200 lbs. per sq. in.

The preferred curing temperature for HMP-urea is 120° to 175° C.

*Preparation of thermoset resin from a viscous mixture obtained from HMP and added phenol, followed by bodying*

An adhesive was prepared by mixing 100 grams of HMP+phenol solution (34% total F, 36% total P, prepared by the method hereinabove described), 20 grams of walnut shell flour and 0.35 gram of ammonium chloride. Douglas fir plywood was prepared using this adhesive in the manner described in the two experiments hereinabove just described, the spreading rate being 60 lbs. of liquid glue per 1000 sq. ft. of single glue line. The resulting plywood passed the commercial standard tests CS 45-48 for flame-resistance and resistance to boiling water.

The preferred temperature for preparing thermoset resins from HMP, with added urea or phenol, is 120° to 175° C.

In addition to the methods for employing the compositions obtained in the practice of this invention hereinabove described, it is to be understood that numerous other useful applications of the said compositions may be made. For example, these uses include wood impregnating compositions to increase the hardness, stability, and resistance to fungi, insects, marine borers, flame and outdoor exposure; assembly adhesives; adhesives to bond sawdust, metals, paper, etc.; production of plastics, ion exchange resins, foundry sand molds, foams, castings, brake linings, lacquers, varnishes and tanning agents; aqueous resin solutions to increase wet strength of paper, to creaseproof and stabilize dimensions of textiles such as cotton, viscose, wool, etc., and to increase the durability of leather and bristles; and agents to seal off oil wells to prevent undesired seepage of liquids from confined places.

In connection with the foregoing uses, it is frequently desirable to employ the compositions obtained in the practice of this invention as cold-setting resins rather than as thermosetting resins; for example, when a urea-HMP composition is used as a plywood adhesive the curing of the adhesive can be accomplished by heating under pressure as hereinabove set forth, or pressure can be applied for a longer period (e. g. 24 hours) without the application of heat. A thickener such as walnut shell flour can be used in such applications, and this is desirable even when the HMP is thickened by the hereinabove described procedures, prior to adding the urea. Of course, when the composition is to be employed for the purpose of impregnating wood, no thickening step, and no added thickener, is desirable. The natural acidity of the wood can be used to effect the cure at normal kiln temperatures.

While the invention has been described herein as applied to compositions obtained from phenol and formaldehyde, or phenol, formaldehyde and urea, it is to be understood that numerous other resin-forming ingredients may be substituted at least in part for the urea or for the phenol. Such resin-forming ingredients include thiourea, alkyl-substituted ureas, alkyl-substituted thioureas, melamine, alkyl-substituted melamines, dicyandiamide, guanidine, aniline, hexamethylenediamine, sulfonamides, adipamide, rescorcinol, cresol, t-butylphenol, phenylphenol, etc., and methylol derivatives thereof or mixtures of said resin ingredients or their methylol derivatives. The urea component may be introduced in the form of a higher methylolurea, such as those obtained by the process of the Kvalnes Reissue Patent 23,174. Moreover, such higher methylolureas can be modified by addition of phenol to produce HMP compositions, like those described herein, modified by urea.

Numerous embodiments of the invention will occur to those who are skilled in the art, and it is my intention that all such embodiments be included within the scope of the present invention.

I claim:

1. A process for preparing a stable, clear polymethylolphenol liquid which comprises heating from 4.0 to 10.0 mols of monomeric formaldehyde per mol of phenol at a temperature within the range of 60° C. to 100° C. at a pH within the range of 7.0 to 9.5 until the free formaldehyde content of the resulting mixture is less than 35% by weight, and cooling the mixture to below 30° C., said formaldehyde reactant being employed in the form of aqueous formaldehyde containing 58% to 65% by weight of formaldehyde based on the total weight of formaldehyde plus water, said phenol reactant being employed in the form of phenol containing not more than 20% by weight of water based on the weight of phenol plus water.

2. A process for preparing a stable, clear polymethylolphenol liquid which comprises heating from 4.0 to 10.0 mols of monomeric formaldehyde per mol of phenol at a temperature within the range of 60° C. to 100° C. at a pH within the range of 7.0 to 9.5 until the free formaldehyde content of the resulting mixture is less than 35% by weight, cooling the mixture to below 30° C. and adjusting the pH to from 4.5 to 6.8, said formaldehyde reactant being employed in the form of aqueous formaldehyde containing 58% to 65% by weight of formaldehyde based on the total weight of formaldehyde plus water, said phenol reactant being employed in the form of phenol containing not more than 20% by weight of water based on the weight of phenol plus water.

3. A process for preparing a stable, clear polymethylolphenol liquid which comprises heating from 4.0 to 10.0 mols of monomeric formaldehyde per mol of phenol at a temperature within the range of 80° C. to 95° C. at a pH within the range of 7.5 to 8.5 until the free formaldehyde content of the resulting mixture is less than 35% by weight, cooling the mixture to below 30° C. and adjusting the pH to from 5.5 to 6.5, said formaldehyde reactant being employed in the form of aqueous formaldehyde containing 58% to 65% by weight of formaldehyde based on the total weight of formaldehyde plus water, said phenol reactant being employed in the form of phenol containing not more than 20% by weight of water based on the weight of phenol plus water.

4. A polymethylolphenol composition obtained in accordance with the process of claim 1.

5. A polymethylolphenol composition obtained in accordance with the process of claim 2.

6. A process for preparing a viscous liquid resin-forming composition which comprises adjusting the pH of the composition of claim 4 to 7.5-9.5 and heating the resulting composition at a temperature of 70°-100° C. until the viscosity of the said composition has substantially increased.

7. A viscous liquid composition obtained in accordance with the process of claim 6.

8. A process for preparing a viscous liquid resin-forming composition which comprises admixing urea with the composition of claim 6.

9. The composition obtained by the process of claim 8.

10. The method for preparing a thermoset resin which comprises heating the composition of claim 9 in the presence of an acid catalyst at a temperature within the range of 120° to 175° C.

11. A process for preparing a viscous liquid resin-forming composition which comprises admixing phenol with the composition of claim 5, and heating the resulting mixture at a temperature within the range of 70° to 100° C. at a pH of 7.0 to 9.5 until the free formaldehyde content thereof reaches 0, thereafter continuing heating the mixture at a pH of 7.5 to 8.5 at a temperature within the range of 70° to 100° C. until the viscosity thereof has substantially increased.

12. The viscous liquid resin-forming composition obtained by the process of claim 11.

13. The method for preparing a thermoset resin which comprises heating the composition of claim 12 in the presence of an acidic catalyst at a temperature within the range of 120° to 175° C.

14. A process for preparing a viscous liquid resin-forming composition which comprises admixing phenol with the composition of claim 4 and heating the resulting mixture at a temperaturt within the range of 70° to 100° C. at a pH of 7.0 to 9.5 until the free formaldehyde content reaches a value of less than 5% and the viscosity has substantially increased.

15. A monomeric polymethylolphenol composition obtained by the process of claim 1 and containing 1.34 to 3.0 methylol groups per unit of phenol.

HAMLINE M. KVALNES.

No references cited.